(12) United States Patent
Threefoot et al.

(10) Patent No.: US 9,338,223 B2
(45) Date of Patent: May 10, 2016

(54) PRIVATE CLOUD TOPOLOGY MANAGEMENT SYSTEM

(71) Applicant: Verizon Patent and Licensing Inc., Basking Ridge, NJ (US)

(72) Inventors: Matthew John Threefoot, Columbia, MD (US); Thierry R. Sender, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 13/966,387

(22) Filed: Aug. 14, 2013

(65) Prior Publication Data

US 2015/0052247 A1 Feb. 19, 2015

(51) Int. Cl.
*G06F 15/173* (2006.01)
*H04L 29/08* (2006.01)

(52) U.S. Cl.
CPC .................................. *H04L 67/10* (2013.01)

(58) Field of Classification Search
USPC ......... 709/221, 223, 224, 225, 235, 244, 203, 709/217, 219, 226, 228, 232, 238; 370/252, 370/351, 389; 726/23
See application file for complete search history.

(56) References Cited

U.S. PATENT DOCUMENTS

| 7,373,394 | B1* | 5/2008 | Li ........................ H04L 12/185 370/389 |
| 7,760,701 | B2* | 7/2010 | Levy-Abegnoli . H04L 29/12009 370/351 |
| 8,799,322 | B2* | 8/2014 | deMilo ............. G06F 17/30082 707/791 |
| 2005/0050225 | A1* | 3/2005 | Tatman ................... H04L 45/04 709/244 |
| 2005/0071469 | A1* | 3/2005 | McCollom .......... H04L 67/1002 709/225 |
| 2010/0220623 | A1* | 9/2010 | Cave ..................... H04L 1/0007 370/252 |
| 2010/0251329 | A1* | 9/2010 | Wei ..................... H04L 63/1408 709/235 |
| 2013/0031232 | A1* | 1/2013 | Clymer ................ G06Q 10/101 709/223 |
| 2013/0080623 | A1* | 3/2013 | Thireault ............... G06F 9/5027 709/224 |
| 2013/0191531 | A1* | 7/2013 | Kruglick ............. H04L 41/5038 709/224 |
| 2013/0198805 | A1* | 8/2013 | Strebe ................... H04L 63/101 726/3 |
| 2014/0047084 | A1* | 2/2014 | Breternitz ........... H04L 67/1008 709/221 |

\* cited by examiner

*Primary Examiner* — Quang N Nguyen

(57) ABSTRACT

A device configured to receive network topological information from devices in a private Internet Protocol (PIP) network receive network performance data from the devices; receive service topological information from a cloud; receive service performance data from the cloud; receive policies for determining optimum routes to the cloud from an administration device; apply the policies to the network topological information from the devices, the network performance data, the service topological information, and the service performance data to obtain routing rules; and forward the routing rules to a set of request routers.

19 Claims, 17 Drawing Sheets

FIG. 4
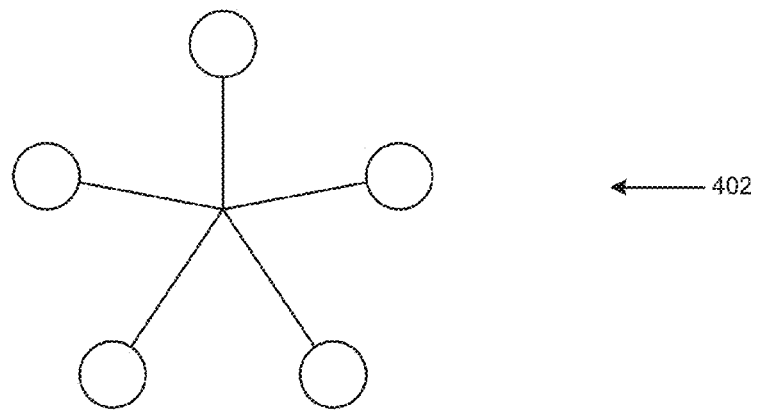
← 402
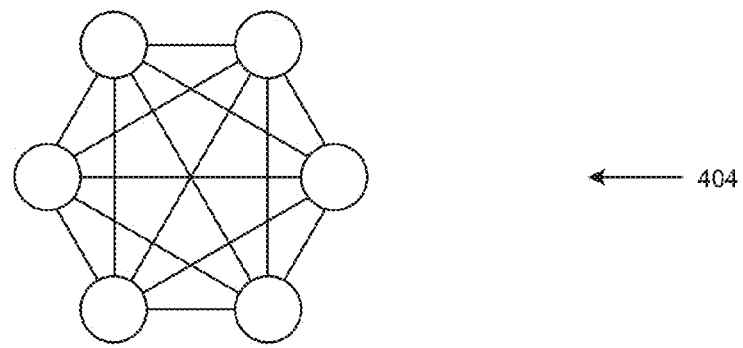
← 404
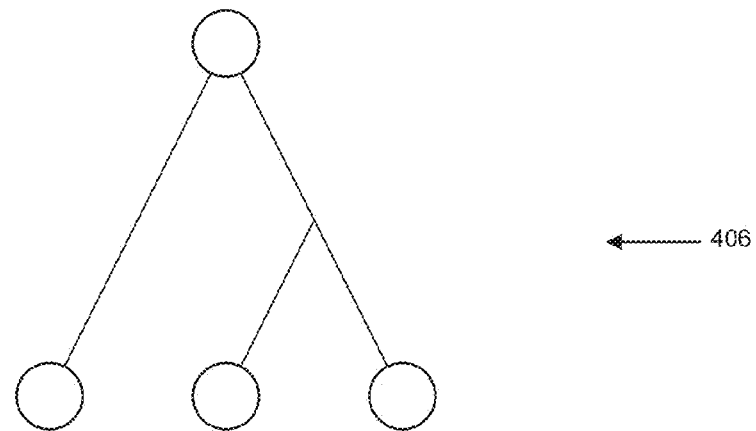
← 406

| SERVICE CLASS 602-1 | DSCP MARKING 602-2 | IP PRECEDENCE CLASS SELECTOR 602-3 |
|---|---|---|
| VOICE/REAL TIME DATA 604-1 | EF 604-2 | 5 604-3 |
| VIDEO/PRIORITY DATA (HIGH) 606-1 | AF41 606-2 | 4 606-3 |
| VIDEO/PRIORITY DATA (LOW) 608-1 | AF42/43 608-2 | N/A 608-3 |
| MISSION CRITICAL DATA (HIGH) 610-1 | AF31 610-2 | 3 610-3 |
| MISSION CRITICAL DATA (LOW) 612-1 | AF32/33 612-2 | N/A 612-3 |
| BUSINESS DATA (HIGH) 614-1 | AF21 614-1 | 2 614-3 |
| BUSINESS DATA (LOW) 616-1 | AF22/23 616-2 | N/A 616-3 |
| GENERAL DATA (HIGH) 618-1 | AF11 618-2 | 1 618-3 |
| GENERAL DATA (LOW) 620-1 | AF12/13 620-2 | N/A 620-3 |
| DEFAULT DATA 622-1 | DF 622-2 | 0 622-3 |

| | AWS DC 804-1 | AWS NEW YORK CITY 804-2 | AWS LOS ANGELES 804-3 | GOOGLE DC 804-4 | GOOGLE NEW YORK CITY 804-5 | GOOGLE LOS ANGELES 804-6 |
|---|---|---|---|---|---|---|
| COST (CENTS/ GB) 802 | 2 | 3 | 3 | 2 | 4 | 2 |

PRIVATE CLOUD TOPOLOGY MANAGEMENT SYSTEM

BACKGROUND INFORMATION

The term "cloud" or "cloud computing" may refer to a network for providing hosted services over the Internet (or another network) or to providing hosted services by the cloud, respectively. Cloud services are generally tailored to give the illusion of unlimited and ubiquitous resource availability. Services provided by a cloud may include a Software-as-a-Service (SaaS), Platform-as-a-Service (PaaS), and Infrastructure-as-a-Service (IaaS).

SaaS includes providing software application instances via the cloud. Typically, such applications are client-server types, with the server instances running in the cloud and the client instances running on customer devices. Examples of SaaS applications include Microsoft Office 365 and Google Apps.

PaaS includes provisioning platforms needed for deployment of software applications on the cloud (e.g., operating systems, web servers, databases, etc.). Examples of PaaS systems include Amazon Web Services (AWS) Elastic Beanstalk and Google App Engine.

IaaS includes provisioning physical devices or virtual machines, disk spaces, computing power, memory, network devices (e.g., physical and/or virtual routers, etc.). Users may install operating systems, applications, etc. on the provisioned infrastructure. Examples of IaaS systems include Amazon Elastic Compute Cloud (EC2) and Google Compute Engine.

BRIEF DESCRIPTION OF THE DRAWINGS

FIG. 4 illustrates different exemplary network topologies;

FIG. 6 illustrates exemplary quality-of-service (QoS) classes and corresponding differentiated service code point markings;

DETAILED DESCRIPTION OF PREFERRED EMBODIMENTS

The following detailed description refers to the accompanying drawings. The same reference numbers in different drawings may identify the same or similar elements.

As described herein, a private cloud topology management (PCTM) system may optimize a user's cloud traffic (e.g., traffic from/to the customer to/from the cloud), by routing/guiding the traffic over the best network path. The user may be connected to a landline network or a wireless network and in a private or public network.

Figure 1A:
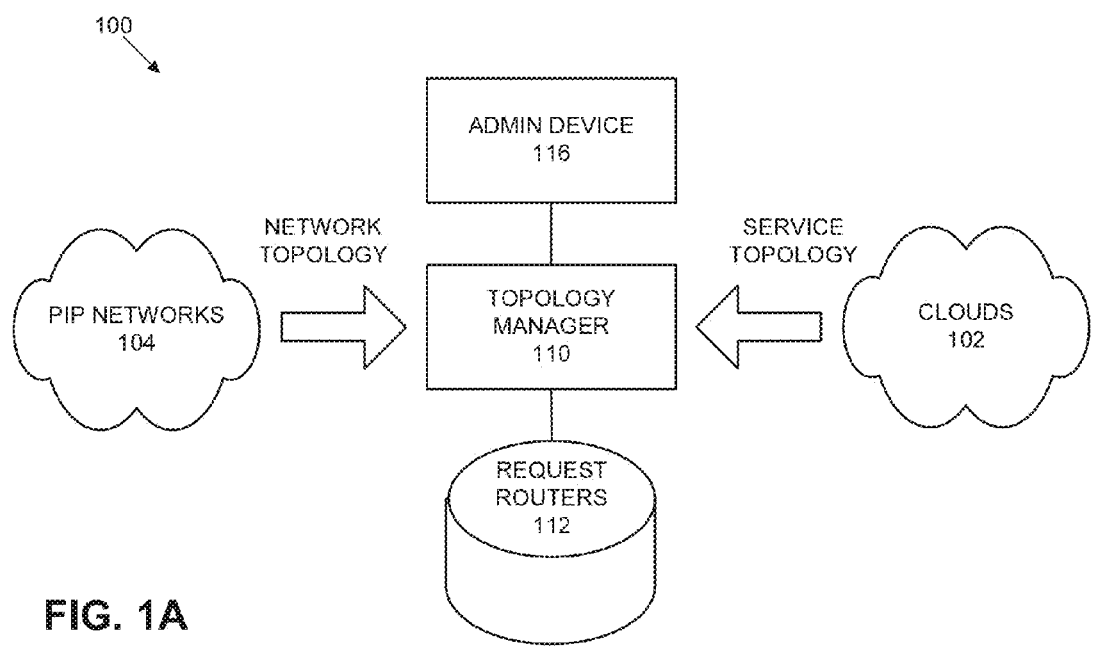
FIG. 1A illustrates an overview of an exemplary network in which concepts described herein may be implemented.

FIG. 1A illustrates an overview of an exemplary network 100 in which concepts described herein may be implemented. As shown, network 100 may include: clouds 102, private Internet Protocol (IP) (PIP) networks 104, topology manager 110, request routers 112, and an administration device 116.

As shown, clouds 102 provide services to users (not shown) that are in or connected to PIP networks 104. On PIP network-by-PIP network basis, topology manager 110 collects network service topology information from clouds 102, network topology information from PIP network 104, and policies from administration device 116. Based on the received information, topology manager 110 generates routing rules or a routing table that specify optimum paths over which traffic flow from/to devices in PIPS 104 to/from clouds 102. Topology manager 110 then distributes the routing table/routing rules to request routers 112. When a user device in PIP network 104 attempts to access a service provided by one of clouds 102, the user device obtains the routing information, directly or via another device (e.g., a web server), from request routers 112. Based on the routing information, the user device may access the service over the optimum path.

Figure 1B:
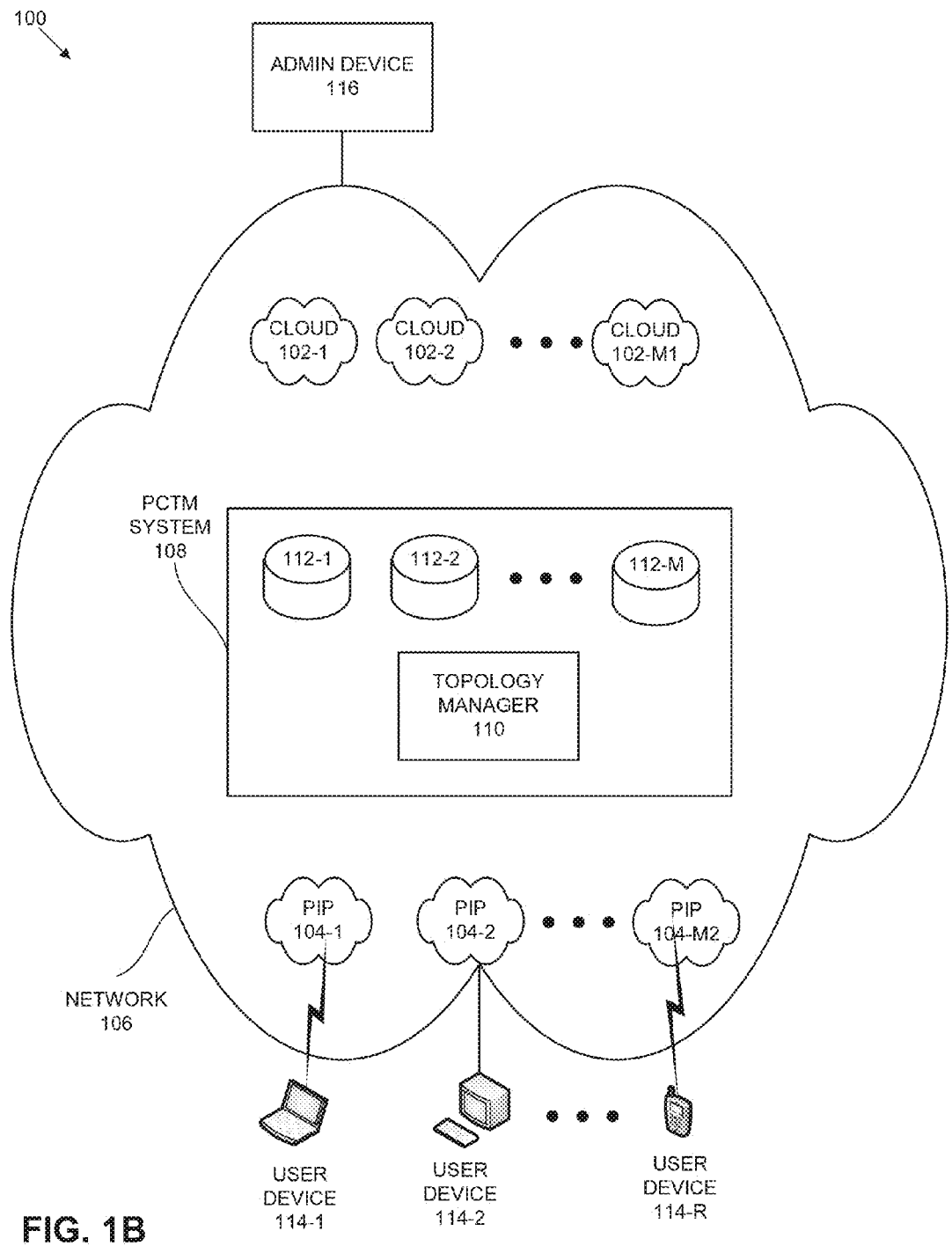
FIG. 1B illustrates an exemplary network in which concepts described herein may be implemented.

FIG. 1B illustrates network 100 in greater detail. As shown, network 100 includes network 106, user devices 114-1 through 114-R (collectively referred to as user devices 114 and individually as user device 114), and administration device 116.

Network 106 may include the Internet, an intranet, a cloud network, a virtual private network (VPN), a software defined network (SDN), a service provider network, a local area network (LAN), a wide area network (WAN), a metropolitan area network (MAN), a cellular network, a public switched telephone network (PSTN), an optical network, an ad hoc network, any other network, or a combination of one or more networks.

As further shown, network 106 may include clouds 102-1 through 102-M1 (collectively referred to as clouds 102 and individually as cloud 102), PIP networks 104-1 through 104-M2 (collectively referred to as PIP networks 104 and individually as PIP network 104), and PCTM system 108.

Cloud 102 may include a network that provides hosted services. As discussed above, the hosted services may include SaaS, PaaS, and/or IaaS. In addition, some clouds 102 may provide a network-as-a-service (NaaS). A public cloud may render the hosted services over the Internet, while a private cloud may render its services over a private network. Exemplary services may include storage services, backup services, spam filtering, web services, managed services, etc.

PIP network 104 may include a private IP network, which may include a VPN. PIP network 104 may be a logical or a physical network. A logical network may include network elements (e.g., logical or physical) interconnected or communicating over logical paths (e.g., tunnels). For example, a remote device may connect to a PIP network via a tunnel.

PCTM system 108 may provide for optimization of data transport between a user device in PIP network 104 and cloud 102. As briefly discussed above, PCTM system 108 may route the traffic over the best network path between the user device and the cloud (e.g., the path that optimizes a particular performance metric).

As further shown in FIG. 1B, PCTM system 108 may include topology manager 110 and request routers 112-1 through 112-M (collectively request routers 112 and individually a request router 112). Depending on the implementation, PCTM system 108 may include additional, fewer, different, or a different arrangement of devices than those illustrated in FIG. 1B.

Topology manager 110 may receive cloud ranking policies and/or cloud/route selection policies (e.g., business rules) from administration device 116; and receive network/cloud data from devices in network 106. Based on the information, topology manager 110 may generate or update network models (e.g., topologies). In addition, topology manager 110 may analyze traffic based on the received network data and the network models. Cloud ranking policies and cloud/route selection policies are described below in greater detail.

Topology manager 110 may derive routing rules (also referred to as a "routing table") based on network state variables, a particular PIP network 104, network data, and routes (i.e., paths from a user device to a cloud 102), and ranking policies. The routing rules may specify, for a particular set of network state variables and/or network data (e.g., a network address of a domain name system (DNS), a network address of a device that requested the cloud service, the time of the request, bandwidths available to clouds 102, availability of a particular service, health status of clouds 102, load conditions of clouds 102 for a type of service, etc.), a list clouds 102 or paths that may provide the optimum service (e.g., the fastest download time).

Topology manager 110 may initiate pushing the routing rules to request routers 112. Alternatively, topology manager 110 may provide the rules/table upon receipt of a request from request routers 112. In addition, topology manager 110 may convey cloud selection policies received from administration device 116 to request routers 112.

Request router 112 may receive a request to identify a cloud 102 or a network path to the cloud 102, from a network device, such as a DNS device. In response, request router 112 may specify, to the network device, the network address of a cloud 102 or the network path, based on the cloud selection policies and/or the routing rules (for a given service or applications), obtained from topology manager 110.

Alternatively or additionally, request router 112 may delegate its role to or may operate in conjunction with web servers. In such implementations, request router 112 may send the selection policies and/or the routing rules (or a portion of the routing rules) to the web servers that may use the selection policies and the table/rules to provide a hypertext transfer protocol (HTTP) 302 redirect response to a user device 114 requesting the service. As further described below, a web server may identify, to the user device 114, via a HTTP 302 redirect response, a particular cloud 102 or a path that may provide optimum data transport.

Request router 112 may receive single-use tokens from user device 114, and ensure that a request for service is honored by different clouds 102, by re-signing a URL/URI or re-issuing a token. Request routers 112 may be distributed over different geographical locations, and each of request routers 112 may be configured similarly to other request routers 112.

User device 114 may include a handset, cellular phone, smart phone, personal computer, laptop computer, tablet computer, set-top box, gaming console, personal digital assistant (PDA), smart television (TV), and/or another type of communication and/or computational device that is capable of receiving and playing multimedia content.

In accessing a cloud service, user device 114 may follow one of two processes: a single stage cloud selection process (also referred to as "route selection process") or a dual stage cloud/route selection process. In the single stage selection process, user device 114 may make a single request to cloud 102 identified by a DNS. In the dual stage selection process, user device 114 may make two requests to clouds 102: one request to a web server (usually at a first cloud 102) that provides a HTTP 302 redirect response; and another request to a cloud identified by the earlier redirect response. User device 114 may send a request for service to the second cloud 102 and obtain from the second cloud 102 the requested service (e.g., IaaS service, PaaS service, etc.).

Administration device 116 may receive a list of clouds 102, a list of services provided by the clouds 102, a list of policies (e.g., cloud ranking policies, cloud or cloud/route selection policies, etc.), configuration parameters that are associated with collecting network data and obtaining network state variable values, etc. from an administrator/user via a graphical user interface (GUI). Administration device 116 may provide the list of clouds 102, the policies, and the configuration parameters to topology manager 110.

Depending on the implementation, network 100 may include additional, fewer, different, or a different arrangement of components than those illustrated in FIG. 1B. For example, depending on the implementation, functions that are described as being performed by one device may be performed by two or more other devices; and functions that are described as being performed by two or more devices may be performed by one device. In addition, although not illustrated in FIG. 1B, network 100 may include other devices and/or components, such as gateways, bridges, switches, routers, server devices, etc.

Figure 2:
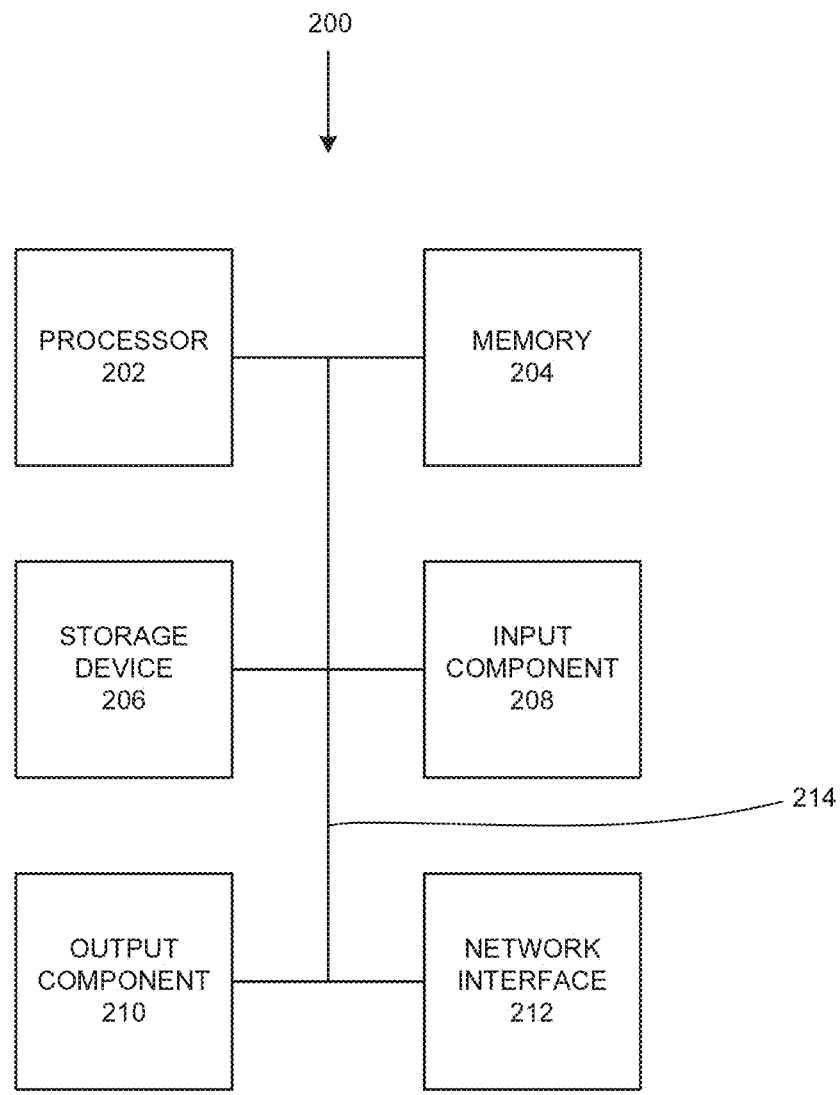
FIG. 2 illustrates exemplary components of the network devices of FIG. 1B.

FIG. 2 is a block diagram of exemplary components of a network device 200. Network device 200 may correspond to any of the devices illustrated in network 100 (e.g., request routers 112, user devices 114, and/or administration device 116) or to one or more servers in clouds 102 or topology manager 110. As shown, network device 200 may include a processor 202, memory 204, storage unit 206, input component 208, output component 210, network interface 212, and communication path 214. In different implementations, network device 200 may include additional, fewer, different, or different arrangement of components than the ones illustrated in FIG. 2. For example, network device 200 may include line cards for connecting to external buses.

Processor 202 may include a processor, a microprocessor, an Application Specific Integrated Circuit (ASIC), a Field Programmable Gate Array (FPGA), and/or other processing logic (e.g., embedded devices) capable of controlling device 200, executing programs/instructions, etc.

Memory 204 may include static memory, such as read only memory (ROM), and/or dynamic memory, such as random access memory (RAM), or onboard cache, for storing data and machine-readable instructions (e.g., programs, scripts, etc.). Storage unit 206 may include a floppy disk, CD ROM, CD read/write (R/W) disc, holographic versatile disc (HVD), digital versatile disc (DVD), and/or flash memory, as well as other types of storage devices (e.g., hard disk drive) for storing data and/or machine-readable instructions (e.g., a program, script, etc.). Depending on the context, the term "memory," "storage," "storage device," "storage unit," and/or "medium" may be used interchangeably. For example, a "computer-readable storage device" or "computer-readable medium" may refer to both a memory and/or storage device.

Input component 208 and output component 210 may provide input and output from/to a user to/from device 200. Input/output components 208 and 210 may include a display screen, a keyboard, a mouse, a speaker, a microphone, a camera, a DVD reader, Universal Serial Bus (USB) lines, and/or other types of components for converting physical events or phenomena to and/or from signals that pertain to device 200.

Network interface 212 may include a transceiver (e.g., a transmitter and a receiver) for device 200 to communicate with other devices and/or systems. For example, via network interface 212, device 200 may communicate over a network, such as the Internet, an intranet, a terrestrial wireless network (e.g., a WLAN, WiFi, WiMax, etc.), a satellite-based network, optical network, etc. Network interface 212 may include a modem, an Ethernet interface to a LAN, and/or an interface/connection for connecting device 200 to other devices (e.g., a Bluetooth interface).

Communication path 214 may provide an interface through which components of device 200 can communicate with one another.

Network device 200 may perform the operations described herein in response to processor 202 executing software instructions stored in a non-transient computer-readable medium, such as memory 204 or storage device 206. The software instructions may be read into memory 204 from another computer-readable medium or from another device via network interface 212. The software instructions stored in memory 204 or storage device 206, when executed by processor 202, may cause processor 202 to perform processes that are described herein.

Figure 3:
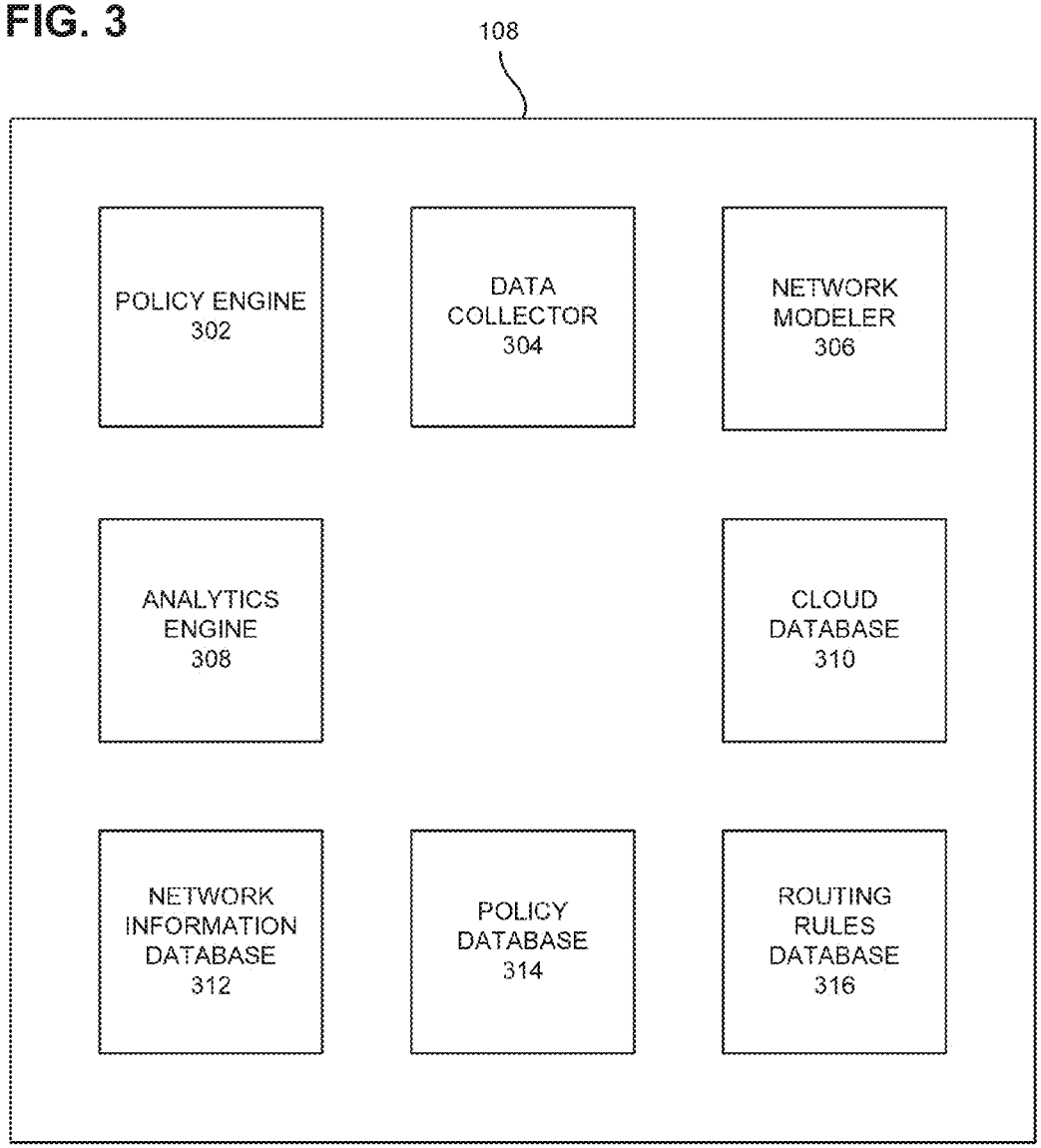
FIG. 3 illustrates exemplary functional components of the exemplary topology manager of FIGS. 1A and 1B.

FIG. 3 is a block diagram of exemplary functional components of topology manager 110. As shown, topology manager 110 may include a policy engine 302, a data collector 304, a network modeler 306, an analytics engine 308, a cloud database 310, a network information database 312, a policy database 314, and a routing rules database 316. Depending on the implementation, topology manager 110 may include additional, fewer, different, or a different arrangement of components than those illustrated in FIG. 3. For example, although not shown in FIG. 3, topology manager 110 may include other components, such as an operating system, communication modules and components for providing reports.

Policy engine 302 may receive policies from administration device 116 and store the received policies in policy database 314. In addition, policy engine 302 may edit, delete, process (e.g., compile or check for errors), and/or apply the policies stored in policy database 314 in response to user input via administration device 116. In addition, policy engine 302 may receive quality-of-service (QoS) classes for each service, and associate those classes with particular clouds 102, using an application programming interface (API). In addition, policy engine 302 may receive latency thresholds, from administration device 116, for selecting a specific cloud or a route.

Policies that policy engine 302 receives from administration device 116 may include cloud policies and routing policies. The cloud policies in turn may include cloud ranking policies and cloud selection policies. The cloud ranking policies include rules that policy engine 302 may apply to a list of clouds (for a given service/application and a VPN) to generate a routing rules/table, based on network information and network state variable values in network information database 314.

The cloud selection policies may include routing rules received from administration device 116. Topology manager 110 may provide the cloud selection policies to request routers 112 along with the routing rules/table. Request routers 112 may use the routing rules and/or apply the cloud selection policies to select a cloud 102 or a route in response to a request from a network device (e.g., DNS server (or to a request from a web server. In some implementations, topology manager 110 may distribute the cloud selection policies and the routing rules to web servers hosted on clouds 102, rather than to request routers 112.

The routing policies may include rules for routing, based on network data (e.g., network traffic, latencies, service type, etc.), state variables, etc.

Policy engine 302 may apply different policies to generate routing rules. For example, policy engine 302 may apply a policy that requires the end-to-end latency for accessing a service be less than 100 milliseconds; a policy for sending customer traffic to a particular site until the customer has sent a terabyte of data each month; a policy for keeping the cost of network traffic below a threshold; or a policy to distribute traffic between two cloud sites; etc.

Data collector 304 may receive information for configuring network components for collecting data (e.g., Simple Network Management Protocol (SNMP) configuration parameters, Netflow configuration parameters, JFlow configuration parameters, scheduling information, etc.) from administration device 116. Data collector 304 may store the configuration information in network information database 312, and apply the received configuration information to data collection components (not shown) installed on devices in network 100 (e.g., servers, gateways, etc.). Data collector 304 may also collect network data received by the data collection components, and store the collected data in network information database 312.

In some implementations, data collector 304 may invoke APIs made available by cloud service providers to determine or identify (for devices in clouds 102) CPUs, memory, server/storage throughout each server/storage farm in the cloud 102, etc. Data collector 304 may store such data in cloud database 310.

Network modeler 306 may determine interconnectivity between networks (e.g., clouds 102, PIP networks 104, etc.), peering points, and/or network devices based on network data and maintain/obtain maps of network topologies (e.g., topologies of clouds 102 for a given service or PIP networks 104). Network modeler 306 may determine or maintain, for example: an integrated content, services, and network layer topology map.

In addition, network modeler 306 may obtain or determine information related to network topologies, such as performance indices, weighted network costs, the lowest/highest cost/performance index for each client network address, etc. For a service/service type, a performance index and weighted network cost may be obtained between cloud node pairs (e.g., two cloud servers); each cloud node (e.g., a server device in the cloud) and edge router pairs; and each cloud node and peering router pairs; etc. In addition, network modeler 306 may correlate service/application topology (discussed below) and the output of analytics engine 308 (discussed below) with network data stored in network information database 312.

Analytics engine 308 may obtain network metrics, statistics and/or network parameters, used to rank clouds 102 or to obtain optimum paths to clouds 102. Analytics engine 308 may obtain, for example, flow information (e.g., data from Netflow, sFlow, IPFIX, etc.), peering ratios between different networks (e.g., ratio of incoming traffic, from a first network to a second network via a peering point, to outgoing traffic from the second network to the first network), the overall bandwidth of a cloud 102, download or upload speeds of a cloud 102, etc.

Cloud database 310 may include a list of clouds and service/application topologies provided via data collector 304 and/or administration device 116. The service/application topologies may include, for example: for a cloud, which cloud service is available from which device; all available services to each VPN; a URI; an IP address; and login/password credentials; specific storage/farm locations; etc. Cloud database 310 may also include information about the CPUs, memories, and storage/servers throughout each cloud 102. The information in cloud database 310, together with results from analytics engine 308 ("analytics information") may be correlated with network data in network information database 312.

Network information database 312 may include topology maps or topology information obtained by network modeler 306, data collector 304, and/or administration device 116. The topology maps may include one or more of, for example: a PIP network or VPN topology map; a multiprotocol label switched (MPLS) topology map; and an autonomous systems (AS) topology map.

FIG. 4 illustrates different types of PIP network/VPN topologies. As illustrated in FIG. 4, a topology may include one of a star topology 402, a fully-meshed topology 404, or a tree topology 406. In star topology 402, each node in a network is connected to a central hub/switch. In fully-meshed topology 404, each node is connected to all other nodes. In tree topology 406, nodes are arranged in a hierarchy. Although not illustrated, a topology may include another type of topology, such as a hybrid topology, a ring topology, extended star topology, etc.

Figure 5:
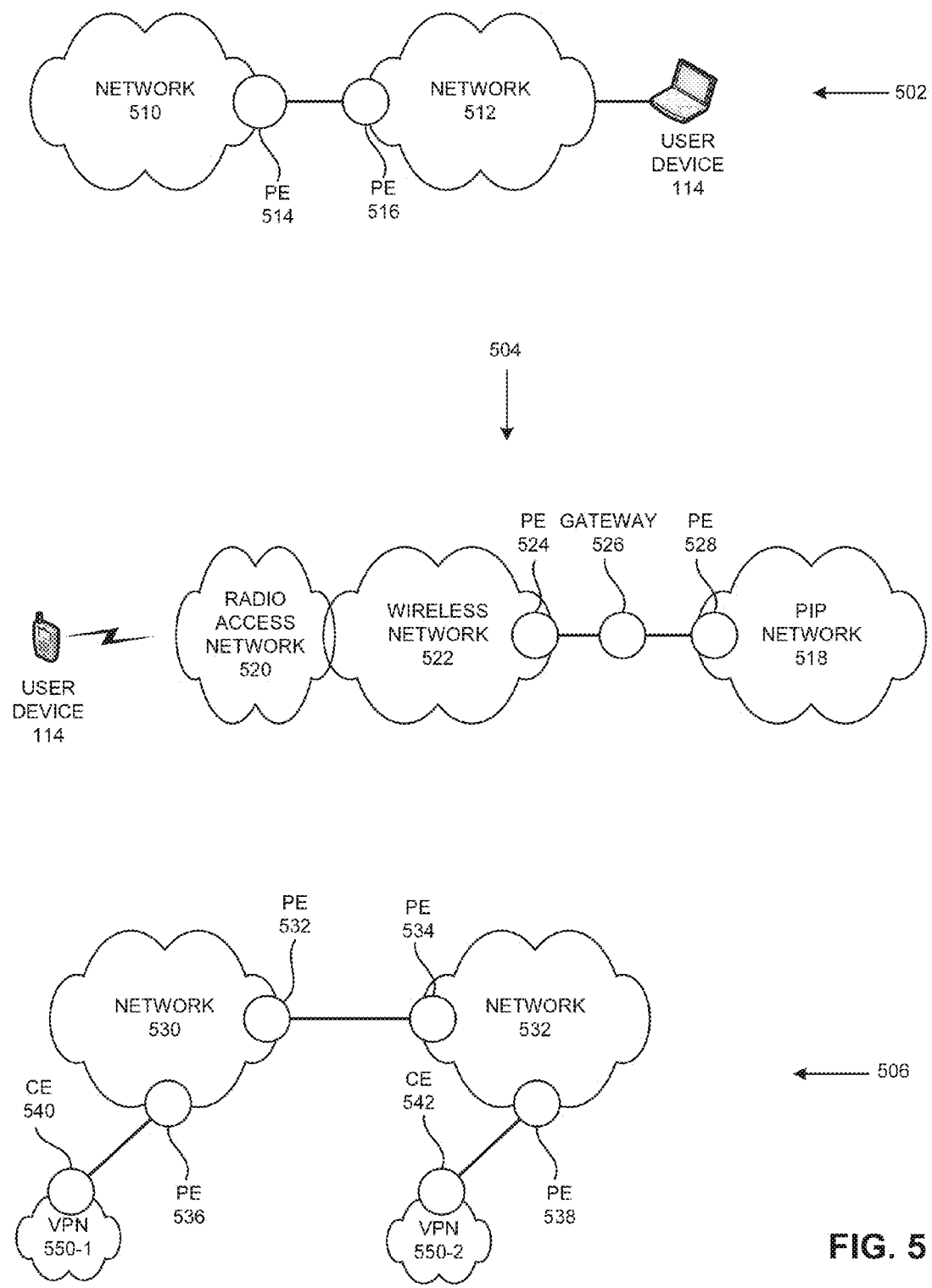
FIG. 5 illustrates different types of private Internet Protocol (PIP) network connectivity.

Returning to FIG. 3, the network topology map may also include information that indicates different types of connectivity between PIP networks and other networks. FIG. 5 illustrates different types of PIP network connectivity. As shown, PIP connectivity may be a PIP network-to-the Internet connectivity 502, a PIP wireless network-through-a wireless gateway connectivity 504, or a PIP network-to-PIP network connectivity 506.

In PIP network-to-the-Internet connectivity 502, a user device 114 may connect to a PIP network 510 via another network 512 (e.g., the Internet). In connecting to network 510, user device 114 may form a tunnel to provider edge (PE) router 514 on network 510.

In PIP wireless network-through-a wireless gateway connectivity 504, a user device 114 may connect to PIP network 520 via a radio access network (RAN) 520 and a wireless network 522. RAN 520 is coupled to wireless network 522. in FIG. 5, an exemplary communication path extends from wireless network 522 to a PIP network 518 via PE routers 524 (on wireless network 522), a gateway 526 (between PE routers), and PE router 528 (on cloud/PIP network 518).

In PIP network-to-PIP network connectivity 506, a user device (not shown) in a VPN 550-1 may connect to a VPN 550-2. An exemplary communication path may extend from VPN 550-1 to VPN 550-2 via a customer edge (CE) router on VPN 550-1, a PE router 536 on network 530, a PE router 532 on network 530, a PE router 534 on network 532, a PE router 538 on network 532, and a CE router 542 on VPN 550-2.

For each of the above connectivity types, the network topology map may include information that indicates which customer addresses map to each border device. Although not illustrated in FIG. 5, there may be other types of connectivity.

Network information database 312 may also include network data obtained by data collector 304. The data obtained by data collector 304 may include: aggregated traffic load on networks (e.g., clouds 102, PIP networks 104, etc.); traffic load between cloud nodes; load conditions of each cloud node; an aggregate bandwidth consumption of cloud traffic; traffic between local and remote AS networks; local traffic route information; ingress and egress traffic between a network and its peer networks or third party networks; inter-AS traffic route information; user device 114 or network device geo-location information; client edge router distribution information in networks; etc.

The traffic data provided to network information database 312 by data collector 304 may include (for each node (e.g., router) from which data is collected) traffic data for different Quality-of-Service (QoS) classes or differentiated service code point (DSCP) markings. FIG. 6 illustrates exemplary QoS and corresponding DSCP markings according to one implementation.

As shown, in this exemplary implementation, service classes 602-1 are mapped to DSCP (or "diff-serv") markings 602-2. More specifically, a Voice/real time data QoS 604-1, Video/Priority Data (High) QoS 606-1, Video/'Priority Data (Low) QoS 608-1, Mission Critical Data (High) QoS 610-1, Mission Critical Data (Low) QoS 612-1, Business Data (High) QoS 614-1, Business Data (Low) QoS 616-1, General Data (High) QoS 618-1, General Data (Low) QoS 620-1, and Default Data QoS 622-1 are assigned DSCP markings of Expedited Forwarding (EF) 604-2, Assured Forwarding (AF) 41 606-2, AF42/32 608-2, AF31 610-2, AF32/33 612-2, AF21 614-2, AF22/23 616-2, AF11 618-2, AF12/13 620-2, and Default Forwarding (DF) 622-2, respectively.

In this implementation, some of the DSCP markings have corresponding IP Precedence class selectors. More specifically, (EF) 604-2, AF) 41 606-2, AF31 610-2, AF21 614-2, AF11 618-2, and DF 622-2 correspond to IP Precedence selectors of 5, 4, 3, 2, 1, and 0, respectively. No corresponding IP Precedence selectors exist for other DSCP markings (i.e., AF42/43, AF 32/33, AF22/23, and AF 12/13).

Returning to FIG. 3, network information database 312 may also include network statistics/parameters. The network statistics/parameters may include, for example: a percentage of input/output traffic between different content providers; a percentage of input/output traffic between local and remote ASs; statistics on traffic between cloud nodes; processing load conditions on each cloud node; client quality-of-service/experience statistics information; traffic trending information for different types of traffic associated with a content provider, a service provider, an AS or a collection of IP addresses; traffic between different cloud nodes; traffic statistics as functions of time, day, week, etc.; state variables values (e.g., the current load of a cloud 102); ingress/egress traffic and traffic ratio as a function of time, day week, etc. for each peering interface; etc.

Figure 7:
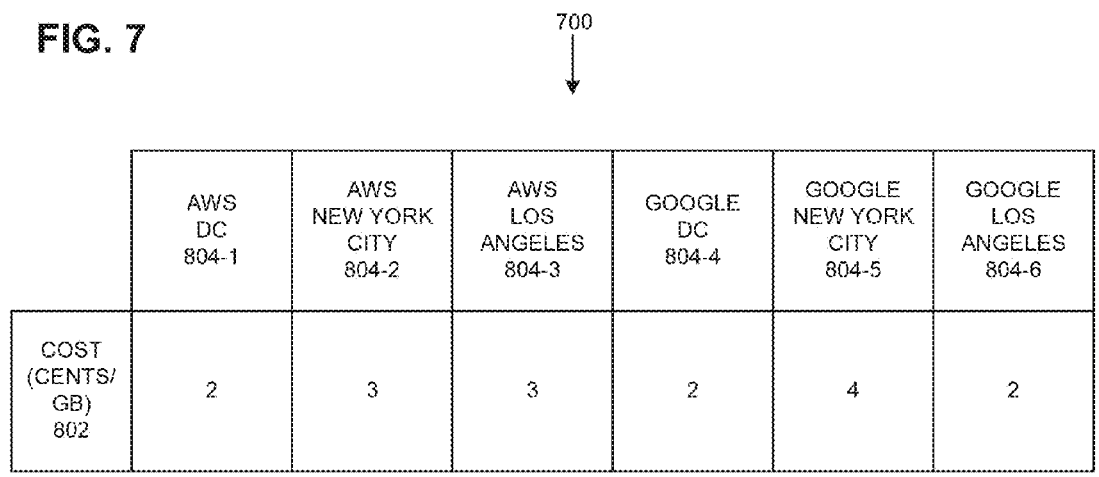
FIG. 7 depicts an exemplary delivery cost table.

Network information database 312 may also include network latency and/or delivery cost information for clouds at different physical locations (e.g., cost of delivering a given amount of data from a point-of-presence (POP) or a user device 114 to a cloud at a given location). FIG. 7 depicts an exemplary delivery cost table 700. For a particular node or a POP, cost table 700 includes the cost row (cents per gigabyte (GB)) and columns of clouds at specific locations, such as Amazon Web Services (AWS) District of Columbia (DC) 804-1, AWS New York City 804-2, AWS Los Angeles 804-3, Google DC 804-4, Google New York City 804-5, and Google Lost Angeles 804-6. The delivery costs for AWS DC 804-1, AWS New York City 804-2, AWS Los Angeles 804-3, Google DC 804-4, Google New York City 804-5, and Google Lost Angeles 804-6 are illustrated as 2, 3, 3, 2, 4, and 2 cents/GB, respectively.

Returning to FIG. 3, policy database 314 includes cloud ranking policies cloud selection policies, and routing policies. As describe above, the cloud ranking policies include rules (e.g., business rules) that policy engine 302 may apply to a list of clouds to generate routing rules/table or a ranked list of clouds. The cloud selection policies include rules that policy engine 302 may distribute to request routers 112. Request routers 112 may enforce the cloud selection policies in selecting clouds 102, in response to requests for service or in response to requests to identify a cloud 102.

Cloud ranking policies or cloud selection policies may include business rules. Cloud ranking policy, for example, may include a rule for ranking a cloud based on contractual obligations of one entity (e.g., a service provider network) to another entity that owns a cloud 102. A cloud selection policy may include, for example: a business rule for directing all service requests for content to a single cloud 102; or a rule for splitting requests for content between two or more clouds 102.

A business rule may include ranking/selecting a particular cloud 102 based on characteristics of clouds 102. The characteristics may include, for example: for a given service/application, whether a cloud supports multicast; IPv6 delivery; specific protocol versions; service protocols; services/applications available at cloud; geographical locations of clouds 102; health status of clouds 102; identities of clouds 102 or entities that own clouds 102; IP addresses of clouds 102; etc.

A business rule may also include ranking/selecting clouds based on characteristics that are associated with a device requesting a service/application or requesting the identity of a cloud (e.g., user device 114 or a DNS server) and based on the characteristics of clouds 102. For example, a rule may require that, for a given service/application, a cloud be selected based on the IP address of user device 114 and IP addresses of clouds 102 (e.g., select a cloud 102 whose IP address prefix best matches the IP address of user device 114). In another example, a rule may require that a cloud 102 be selected based on the following: the IP address of user device 114; geographical locations of clouds 102 (e.g., New York city, Texas, etc.); and types of services/applications available at clouds 102. In some instances, a rule may require that a cloud 102 be selected based on the point-of-presence of user device 114 and whether the cloud belongs to a particular business entity (e.g., a business entity that offers network services to user device 114, an entity that with whom the user of user device 114 has a service contract, etc.). A rule may specify other combinations of characteristics of user device 114/DNS server device, and clouds 102.

A business rule may require that, for a given service/application, a request for service to a first cloud 102 be redirected to a second cloud 102 to the extent that the bandwidth ratio of the two clouds stays above a minimum threshold. In another example, a rule may require that a request for service be directed to the second cloud to the extent that the bandwidth per measurement interval for the first cloud stays above a minimum threshold.

In another implementation, a business rule may require selecting a target cloud based on ranking values that are computed as a function of available bandwidths of clouds, over a measurement interval, or a function of a bandwidth ratio, between a first network (a network with which user device 102 is associated, such as a service provider network) and clouds 102. A request for service/application then may be directed to the cloud 102 with the lowest or the highest ranking value. In some implementations, each of the ranking values may be computed as the sum of a ratio (e.g., between a network bandwidth and a cloud 102 bandwidth) and a weighted value associated with the cloud. One reason for adding the weighted value to the ratio may be to bias the selection of the cloud(s) 102.

In another example, a business rule may involve geographical areas, locations, and/or regions. For example, a business rule may require that only a particular cloud 102 be allowed to provide a service to user device 114 in a specific area (e.g., India, Nebraska, New York City, etc.). Such a business rule may allow entities that own clouds 102 to comply with laws, regulations, business arrangements, etc.

In yet another example, a business rule may include determining ranking values based on cache hits, cache misses, cache efficiency, etc. of clouds 102, for a given service. In still yet another example, a business rule may include selecting clouds 102 in a weighted round robin fashion; selecting or distributing requests for service to multiple clouds 102; sending all requests within a specific IP block to a designated cloud 102; etc.

A business rule can be based on user telemetry data from user devices 114. The telemetry data, which is similar to flow data or log data, may be collected via data collector 304. The data may provide topology manager 110 or request routers 112 with information that indicates which IP segments of network 100 are performing optimally.

Both cloud selection policies and ranking policies may include rules based on: cloud performance information; a client service provider information; client account status; peering ratios; flow records; cloud log files; etc.

Routing rules database 316 may include cloud routing rules or a table. Records in the routing rules/table may be a function of service types (or a specific application offered as a service), different network statistics, parameters, state variables, etc. For a given cloud, service type, PIP networks/VPNS, and state variable values, a record in the cloud table may include a URI or IP address, a path, URL signing policies, login/password credentials, rules, etc.

Figure 8:
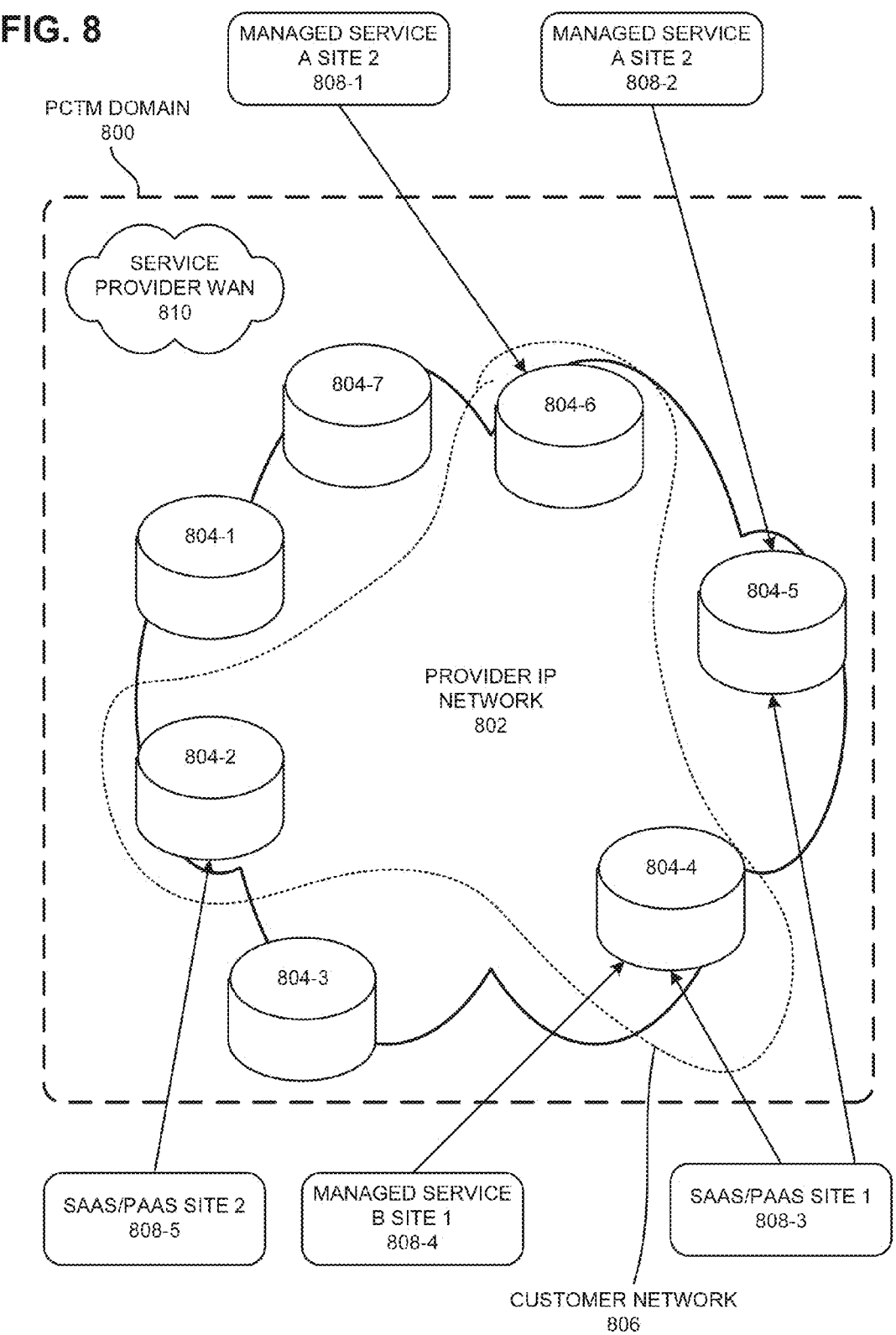
FIG. 8 illustrates an exemplary private cloud topology manager (PCTM) domain.

The routing rules/table in routing rules database 316, in effect, maps out the domain of PCTM system 108 ("PCTM domain"). FIG. 8 depicts an example of a PCTM domain. In FIG. 8, PCTM domain 800 includes service provider IP network 802 and service provider WAN 810. Service provider IP network 802 includes nodes 804-1 through 804-7, which are accessible to customer sites, and customer network 806. Customer network 806 includes nodes 804-2, 804-4, and 804-5.

As further shown, the routing rules specify that node 804-6 access a managed service A site 2 808-1; that node 804-4 access managed service B site 1 808-4 and SaaS/PaaS site 1 808-3; and that node 704-2 access SaaS/PaaS site 2 808-5. The routing rules also specify that node 804-5 access managed service A site 2 808-2 and SaaS/PaaS site 1 808-3. Node 804-5 is not part of customer network 806.

Returning to FIG. 3, policy engine 302 may distribute the table/rules in routing rules database 316 to request routers 112. Having received the table/rules, request routers 112 may use the routing rules/table from routing rules database 316 to direct user devices 114 to a cloud 102 in accordance with a single stage cloud/route selection process or a dual stage cloud/route selection process.

Figure 9:
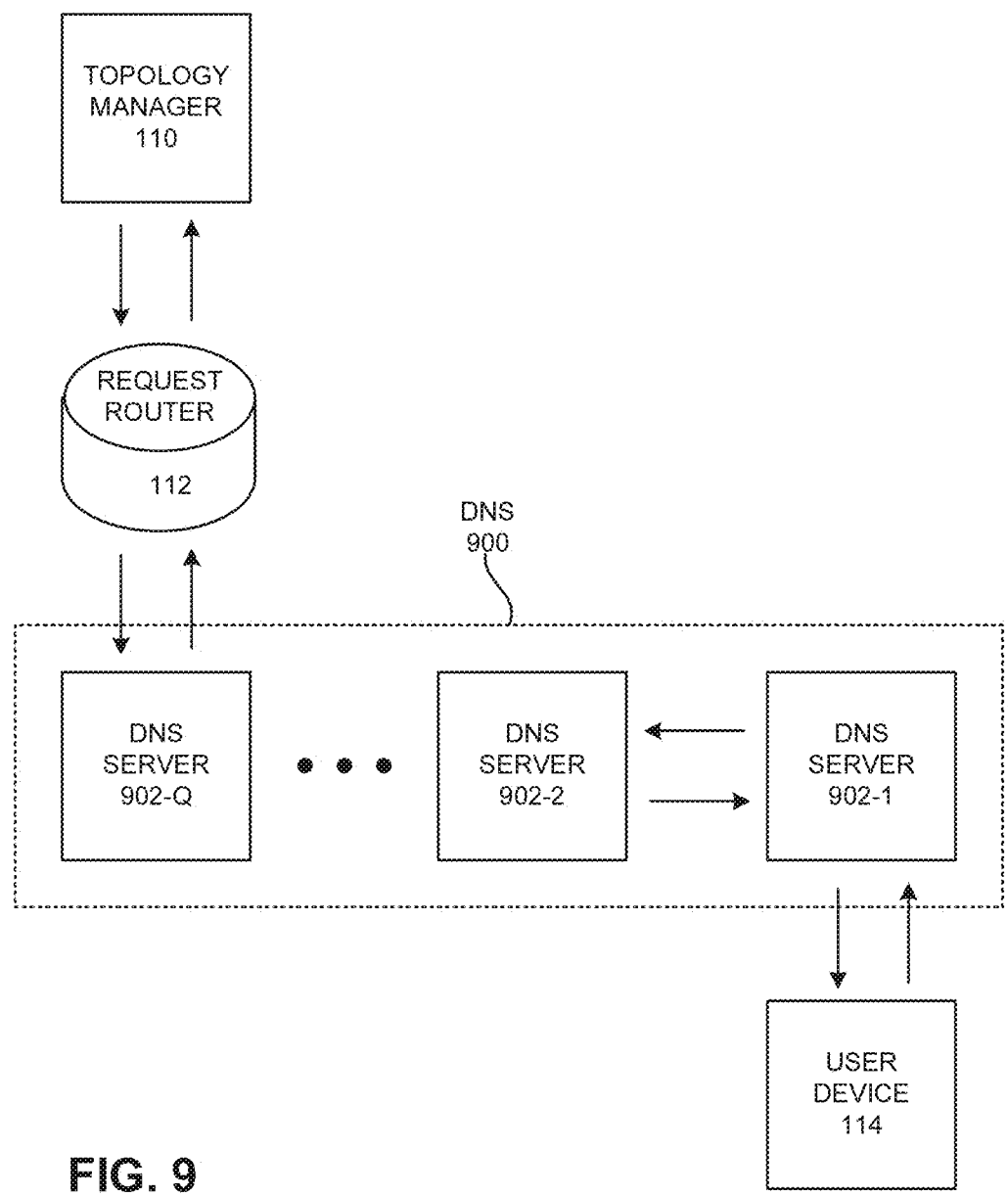
FIG. 9 illustrates exemplary message paths that are associated with a single stage cloud/route selection process.

FIG. 9 illustrates exemplary message paths that are associated with a single stage cloud/route selection process. In FIG. 9, messages flow between topology manager 110, request router 112, user device 114, and a DNS 900. As shown, DNS 900 may include DNS server 902-1 through DNS server 902-Q (collectively DNS servers 902 and individually DNS server 902).

In the single stage cloud selection process, user device 114 (or a resolver on user device 114) sends a query to DNS 900 to resolve a domain name of a cloud 102 to its IP address. If the query is a recursive one, and a first DNS server (e.g., DNS server 902-1) in DNS 900 that receives the query does not have a DNS record to resolve the domain name, the first DNS server sends out a query of its own to a second DNS server (e.g., DNS server 902-2). The second DNS server may then act similarly as the first DNS server to resolve the domain name. The process may continue, until one of DNS servers (e.g., DNS server 902-Q) is directed to request router 112 (via a CNAME record in the DNS server), which applies its routing rules or performs a lookup of the domain name in the cloud routing table, provided by topology manager 110. The IP address of cloud 102 provided by request router 112 then flows through the chain of DNS servers 902 in the direction opposite to the flow of the queries from the resolver to request router 112. Upon receipt of the IP address, user device 114 may use the IP address to request a service from the cloud 102 associated with the IP address.

Figure 10:
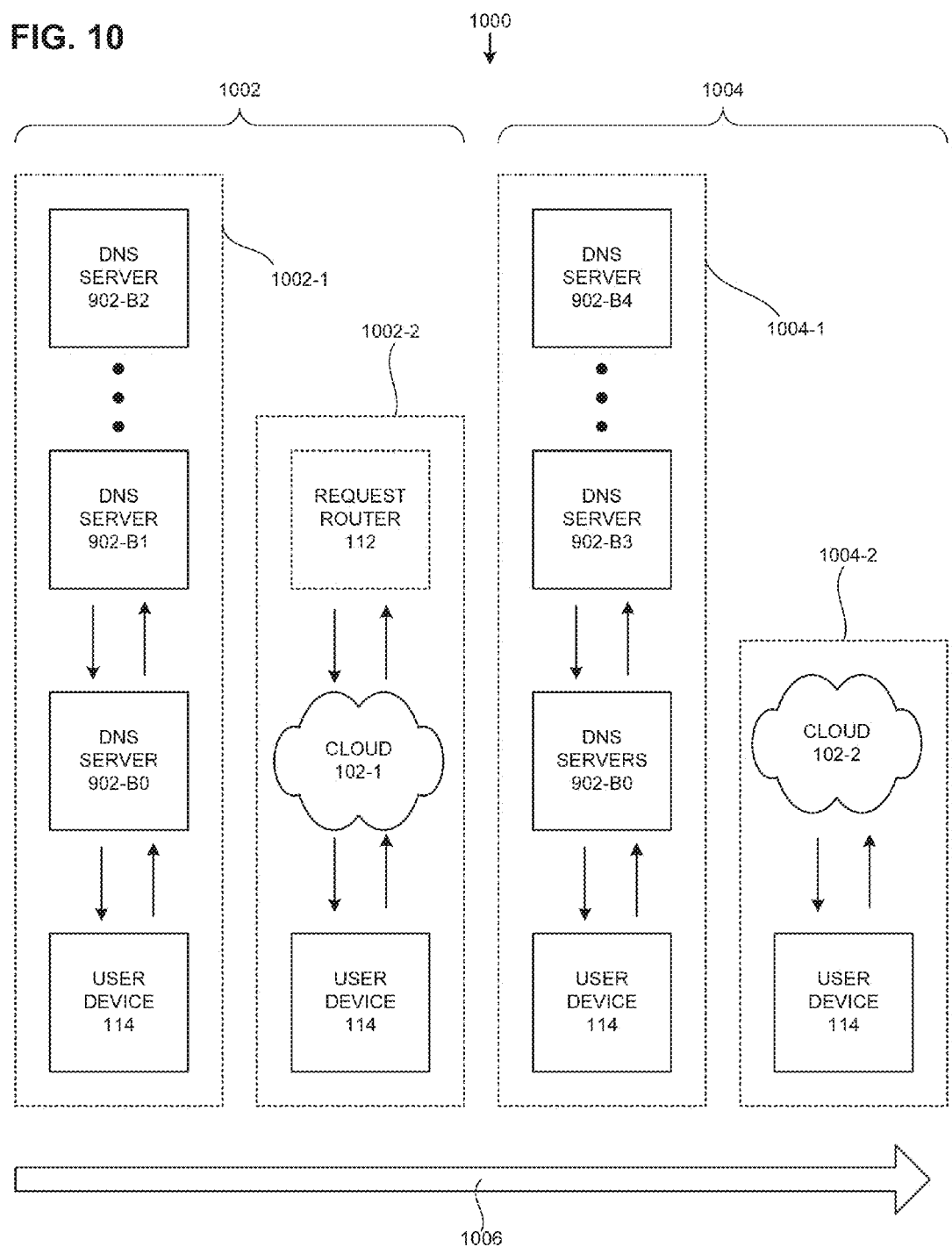
FIG. 10 illustrates exemplary message paths that are associated with a dual stage cloud/route selection process.

FIG. 10 illustrates exemplary message paths that are associated with a dual stage cloud/route selection process. As shown in FIG. 10, the dual stage cloud selection process may include a stage one cloud query 1002 and a stage two cloud query 1004. As further shown, stage one cloud query 1002 includes DNS query 1002-1 and cloud request 1002-2; and stage two cloud query 1004 includes DNS query 1004-1 and cloud request 1004-2. DNS query 1002-1, cloud request 1002-2, DNS query 1004-1, and cloud request 1004-2 may occur in the order indicated by arrow 1006.

For the dual stage process, request router 112 disseminates its information to a web server in a cloud 102, by sending the cloud routing table (received from topology manager 110) to the web server. Alternatively, request router 112 may disseminate the information in response to a request from a web server to identify a cloud 102 that may optimally provide the service requested by user device 114. DNS servers (e.g., DNS server 902-B2 and DNS server 902-B4) are each aware of clouds 102 and their corresponding IP addresses.

DNS query 1002-1 of stage one cloud query 702 may include user device 114 requesting a network address of a cloud 102 from DNS 900, which may include DNS server 902-B0 to DNS server 902-B2 and/or DNS server 902-B0 to DNS server 902-B4. DNS query 1002-1 may conclude with user device 114 receiving a response from DNS 900 (e.g., from DNS server 902-B0). The response may provide an IP address corresponding to the domain name of the cloud 102 (e.g., cloud 102-1), which may not optimally provide the requested service to user device 114.

Cloud request 1002-2 of stage one cloud request 1002 may include user device 114 requesting content from the cloud 102-1, by using the IP address obtained through DNS query 1002-1. When a web server in cloud 102-1 receives the request, however, the web server sends a message to request router 112 to identify a cloud that may best/optimally provide requested service to user device 114. When the web server receives the IP address or the domain name of a second cloud 102 from request router 112, the web server may provide the information to user device 114.

DNS query 1004-1 of stage two cloud request 704 may include user device 114 requesting an IP address of the second cloud 102 from DNS 900. DNS query 1004-2 may conclude with user device 114 receiving a response from DNS 900 (e.g., from DNS server 902-B0). The response may provide an IP address corresponding to the domain name of the second cloud 102 (e.g., cloud 102-2). If user device 114 received the IP address of the second cloud 102-2 at cloud request 1002-2 instead of the domain name of the second cloud 102, DNS query 1004-1 may be omitted.

Cloud request 1004-2 of stage two may include user device 114 requesting content from the second cloud 102-2, by using the IP address obtained through either cloud request 1002-2 or DNS query 1004-1.

In the dual stage cloud selection process of FIG. 10, the web server that requests information about cloud 102 from request router 112 may also relay information about user device 114 (which requested content from the web server) to request router 112. The information passed from the web server to request router 112 may include the IP address of user device 114, a network to which user device 114 belongs, POP information, etc. Request router 112 may use such information to select the second cloud 102 (e.g., by applying routing rules/cloud selection policies).

In contrast, in the single stage cloud selection process illustrated in FIG. 9, a DNS server 902 that requests information from request router 112 may be unable to pass information about user device 114 to request router 112. Accordingly, in the single stage cloud selection process, request router 112 may select a cloud 102 without such information.

Figure 11:
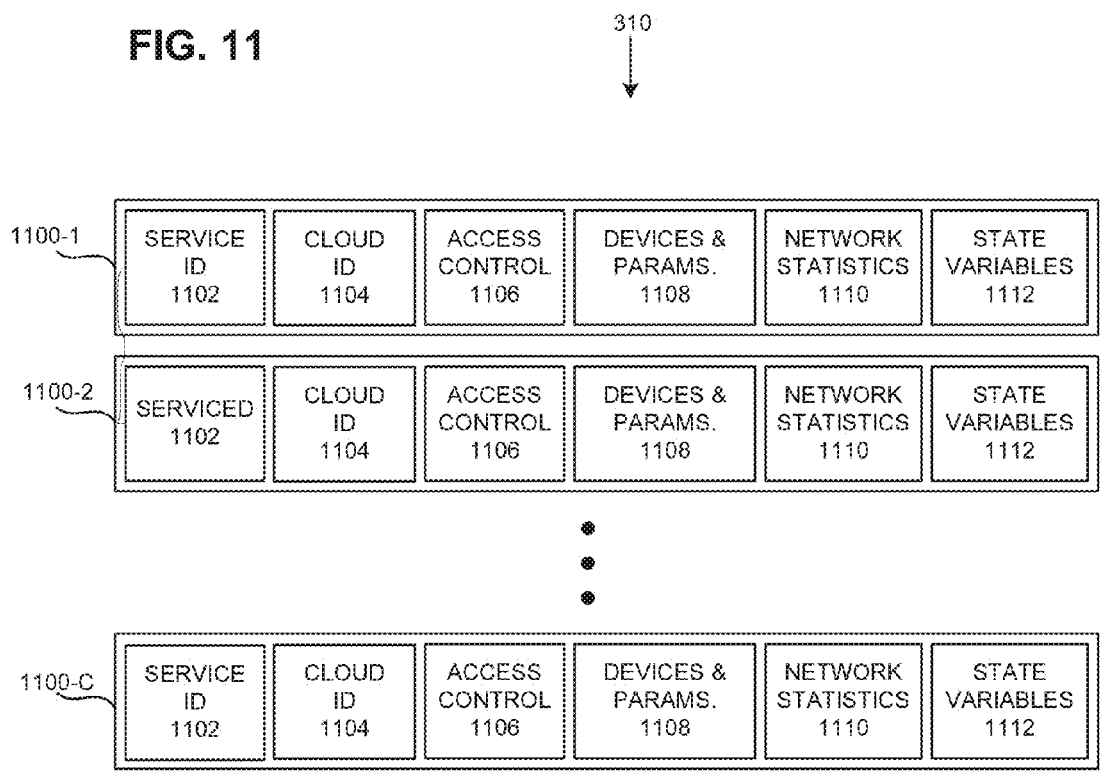
FIG. 11 illustrates exemplary records in the exemplary cloud database of FIG. 3.

FIG. 11 illustrates exemplary records in cloud database 310 of topology manager 110. As shown, cloud database 310 may include records 1100-1 through 1100-C (collectively "records 1100" and individually "record 1100"). Each of records 1100 may include a number of fields: a service identifier (ID) field 1102; a cloud ID field 1104; an access control field 1106; a devices and parameters field 1108; a network statistics field 1110; and a state variables field 1112. Depending on the implementation, records 1100 may include fewer, additional, different, or a different arrangement of fields than those illustrated in FIG. 11.

Service ID field 1102 may include one or more identifiers for particular services or service types. For example, an identifier in service ID field 1102 may identify a service for providing a general or specific type of SaaS, PaaS, IaaS, and/or NaaS. Depending on the implementation, the identifier may also identify other types of services that involve virtual servers, physical servers, an application, etc. In some implementations, service ID field 1102 may identify more than one service that is offered by the cloud associated with record 1100.

Cloud ID field 1104 may identify a cloud 102 which is associated with the record 1100 that includes the ID field 1104. In some implementations, information in cloud ID field 1102 may have been provided by a network administrator via, for example, a GUI on administration device 116.

Access control field 1106 may indicate levels of access that are associated with: IP addresses of user devices 114; domain names; user IDs; etc. Devices and parameters field 1108 may include device or network information that is input by an administrator via administration device 116. For example, in one implementation, devices and parameters field 1108 may identify a network topology, edge routers, gateways, etc. In another example, devices and parameters field 1108 may provide information regarding overall network capacity, server/storage locations for the specific service, bandwidth, memory, disk spaces, etc. In some implementations, devices and parameters field 1108 may also provide information about the CPU, memory, storage locations, bandwidth, etc. for each device in the cloud.

Network statistics field 1110 may include bandwidth, traffic, jitter, delays/latency, and/or error information about devices in a cloud 102 corresponding to record 1100. Network statistics field 1110 may further include statistics that pertain to the cloud 102 and are obtained from the device statistics (e.g., overall network traffic, bandwidth, errors, etc.). Network statistics field 1110 may include time dependent information (e.g., bandwidth of a device at a specific time, day of month, day of week, etc.). In some implementations, the information in network statistics field 1110 may be obtained from data in network information database 312.

State variables field 1112 may include values of parameters that indicate the current state of clouds 102 and/or devices in clouds 102. State variables field 1112 may include, for example, a flag that indicates whether a specific network device (e.g., a peering router) is down, whether the cloud 102 is down; etc. In another example, state variables field 1112 may include currently available bandwidths of individual devices and/or clouds 102.

Figure 12:
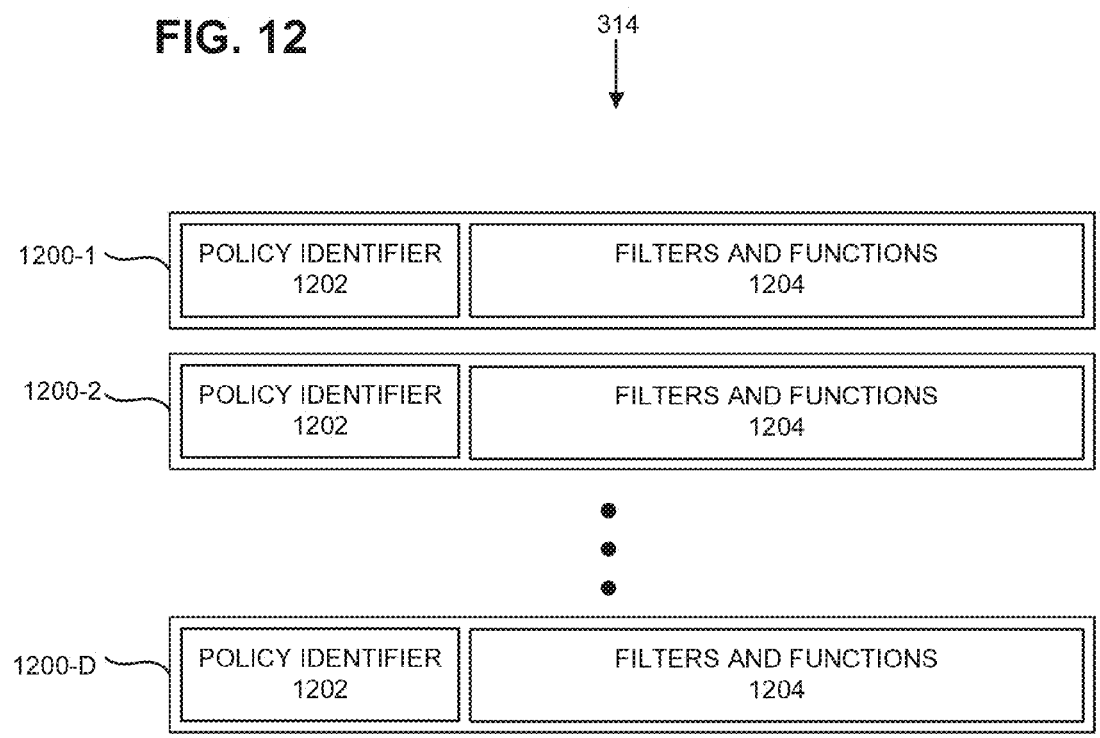
FIG. 12 depicts exemplary records in the exemplary policy database of FIG. 3.

FIG. 12 illustrates exemplary records in policy database 314 of topology manager 110. As shown, policy database 314 may include records 1200-1 through 1200-D (collectively "records 1200" and individually "record 1200"). Each of records 1200 may include a number of fields: a policy ID field 1202; and a filters and functions field 1204.

Policy ID field 1202 may include a string of alphanumeric characters that uniquely identify a policy associated with record 1200. In some implementations, policy ID field 1202 may include multiple fields, each of which includes information for identifying the policy, such as a user ID associated with a cloud 102 or PIP network 104, an administrator ID, a policy type (e.g., characteristic associated with a subscription type or a QoS, etc.), etc.

Filters and functions field 1204 may include conditions for identifying clouds 102 (e.g., from a list of clouds in cloud database 310) or paths to clouds 102 based on one or more datum/factors, such as: access control values in access control value field 1106; and/or values in devices and parameters field 1108; values in network statistics field 1110; and/or values in state variables field 1102. The conditions may be specified via expressions representing mathematical relationships, mathematical operations, and/or symbols that reference information from different fields in records 1100 in cloud database 310.

For example, assume that filters and functions field 1204 for record 1200-1 includes expressions "DAV<T1" and "WAV<T2." Also assume DAV represents a daily average traffic volume and WAV represents a weekly average traffic volume. Accordingly, "DAV<T1" and "WAV<T2" may define filters that identify clouds whose daily average traffic volume is below a threshold T1 and clouds whose weekly average traffic volume is below a threshold T2, respectively.

Filters and functions field 1204 may also specify a relationship between different filters via logical operators or set operators. For example, assume that filters field 1204 for record 1200-1 includes "(DAV<T1) & (WAV<T2)." "(DAV<T1) & (WAV<T2)" may identify clouds 102 that are the intersection of clouds 102 whose each daily average traffic is below T1 and clouds 102 whose each weekly average traffic is below T2.

Filters and functions field 1204 may also include functions to be applied to clouds 102 that are listed in cloud database 310 and/or are identified by the filters in filters and functions field 1204. For example, in one implementation, the functions may include expressions for computing numerical values used to rank clouds ("ranking values"). Each function may reference numbers, mathematical expressions, and/or one or more of: values in access control field 1106; values in devices and parameters field 1108; values in network statistics field 1110; and/or values in state variables field 1112.

For example, assume that F1 represents the result of applying a filter designated or defined in filters and functions field 1204. Also assume that filters and functions field 1204 includes "R1(F1)=1." "R1(F1)=1" may indicate that each of the clouds identified by applying F1 is be assigned a ranking value of one.

Depending on the implementation, records 1200 may include fewer, additional, different, or a different arrangement of fields than those illustrated in FIG. 12. In some implementations, fields in each record 1200 may have a different syntax.

Figure 13:
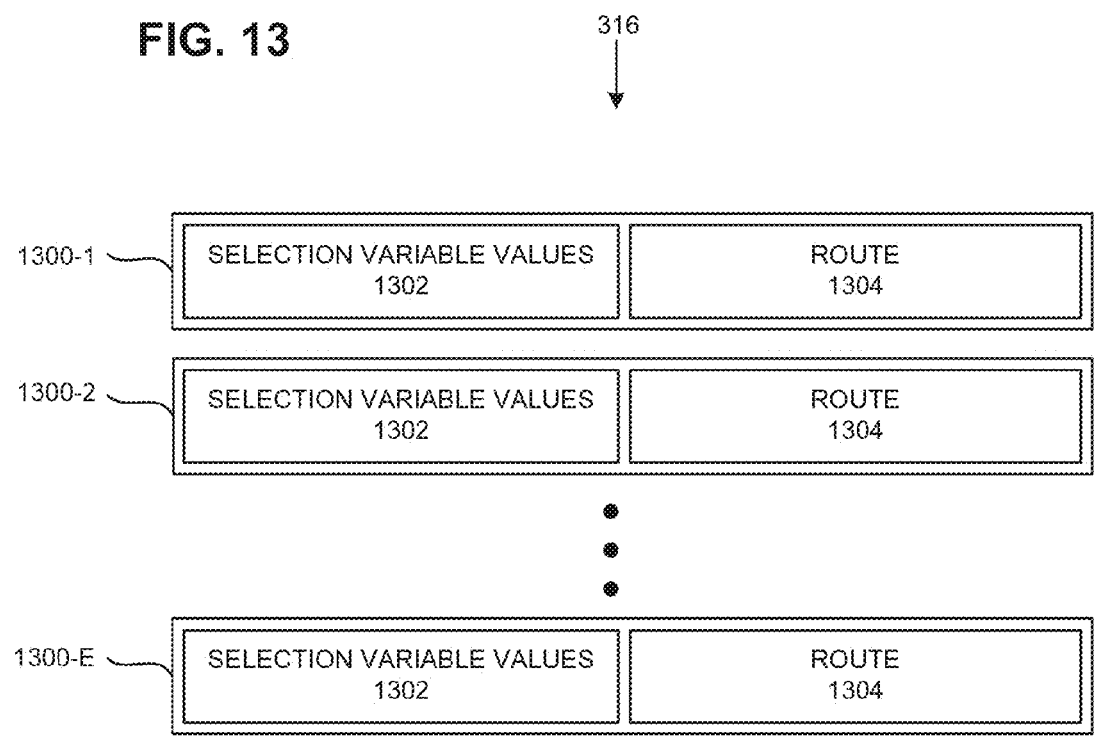
FIG. 13 illustrates exemplary records in the exemplary routing rules database of FIG. 3.

FIG. 13 illustrates exemplary records in routing rules database 316 of topology manager 110. As shown, routing rules database 316 may include records 1300-1 through 1300-E (collectively "records 1300" and individually "record 1300"). Each of records 1300 may include a selection variable values field 1302 and a route field 1304.

Selection variable values field 1302 may include a predetermined set of selected data from: network information database 312; and fields 1102-1112 in a record 1100 of cloud database 310. Each set of values may represent a condition under which the policies specified in policy database 314 have been applied to obtain an optimum path to a cloud. Selection variable values field 1302 may include, for example: a service type (e.g., IaaS, SaaS, PaaS, NaaS, etc.); the IP address of a DNS server that may request the identity of a cloud 102 from which a user device 114 is to obtain a service; a set of IP addresses to which an IP address of user device 114 belongs; time information (e.g., time of day, day of week, day of month, etc.) associated with a request for service; a jitter associated with the path; a latency or delay associated with the path; etc.

Route field 1304 may include a list of ranked routes or clouds from which a user may obtain a particular service. Each of the clouds in the list may be identified by an IP address, a Universal Resource Identifier (URI), a Universal Resource Locator (URL), etc. Each route may be identified by a sequence of network addresses (or identifiers, such as DNS names) that represent nodes of a particular path.

Figure 14:
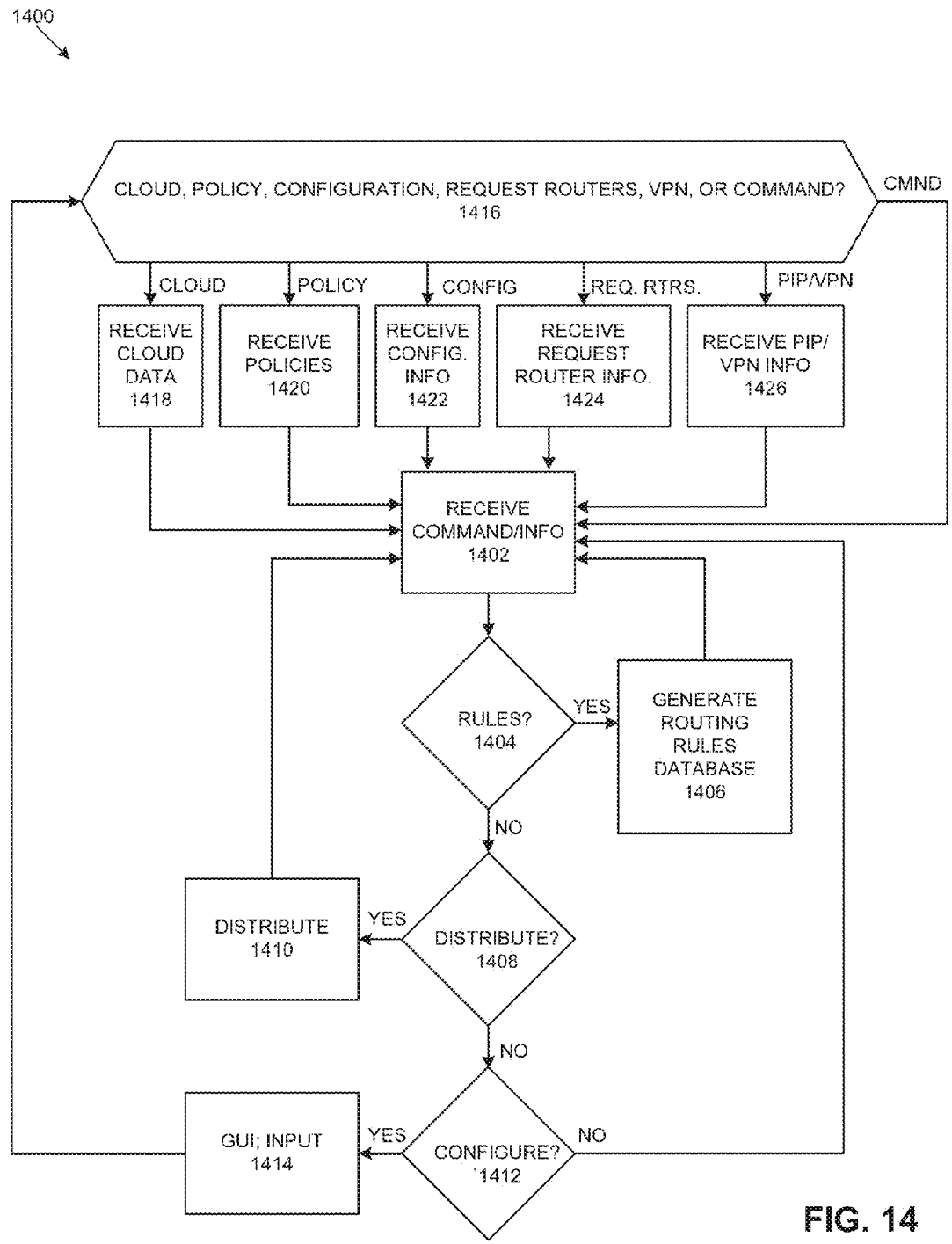
FIG. 14 is a flow diagram of an exemplary process that is associated with the topology manager of FIGS. 1A and 1B.

FIG. 14 is a flow diagram of an exemplary process 1400 that is associated with operation of PCTM system 106. As shown, process 1400 may include receiving user command/input via a GUI interface, by topology manager 110, from administration device 116 (block 1402).

Topology manager 110 may determine whether the user requests routing rules for a list of clouds in cloud database 310 be generated (block 1404). If the topology manager 110 determines that the rules for the list of clouds is to be generated (block 1404: yes), topology manager 110 may generate the rules (block 1406). Generating the rules (or a table) may include applying one or more policies in policy database 314 to the list of clouds, for a chosen set of selection variable values 1302, network information, cloud information, etc. The resulting cloud routing rules may be stored in routing rules database 316. Thereafter, at block 1406, process 1400 may return to block 1402, where topology manager 110 may receive additional commands from administration device 116.

If the cloud routing rules is not to be generated (block 1404: no), topology manager 110 may proceed to block 1408, to determine whether the command received at block 1402 directs topology manager 110 to distribute the cloud routing rules to request routers 112 (block 1408). If the cloud routing rules is to be distributed (block 1408: yes), topology manager 110 may distribute the cloud routing rules to a selected set of request routers 112 (block 1410). Thereafter, at block 1410, process 1400 may return to block 1402.

If the cloud routing rules is not to be distributed (block 1408: no), topology manager 110 may determine whether the command received at block 1402 requires that PCTM system 106 be configured (block 1412). If PCTM system 106 is not to be configured (block 1412: no), process 1400 may return to block 1402. Otherwise (block 1412: yes), topology manager 110 may provide a GUI (e.g., to administration device 116), and receive administrator input (block 1414). Topology manager 110 may proceed to block 1416.

At block 1416, topology manager 110 may determine whether the administrator input indicates that topology manager 110 is to receive one of the following: information regarding a cloud; information about policies; information about configuration data for collecting network data; information about request routers 112 (e.g., addresses of request routers 112 to which routing rules may be distributed); information about PIP networks or VPN; or another command. If the input indicates that another command is to be received (block 1416: command), process 1400 may return to block 1402.

If the input indicates that topology manager 110 is to receive data about a cloud (block 1416: cloud), topology manager 110 may present a user interface for receiving cloud data to administration device 116 and receive the cloud data from administration device 116 (block 1418). If the input indicates that topology manager 110 is to receive policies (block 1416: policy), topology manager 110 may present a user interface for receiving policies to administration device 116 and receive the policies from device 116 (block 1420). If the input indicates that topology manager 110 is to receive configuration information for collecting network data (block 1416: configuration), topology manager 110 may present a user interface for receiving configuration information to administration device 116 and receive the configuration information from administration device 116 (block 1422).

If the input indicates that topology manager 110 is to receive information about request routers 112 (block 1416: request routers), topology manager 110 may present a user interface for receiving information about request routers to administration device 116 and receive the information from administration device 116 (block 1424). If the input indicates that topology manager 110 is to receive PIP/VPN network data (block 1426: PIP/VPN), topology manager 110 may present a user interface for receiving information about PIP/VPN network data and receive the information from administration device 116 (block 1426).

From each of blocks 1418, 1420, 1422, 1424, and 1426, topology manager 110 may return to block 1402 to receive additional commands.

Figure 15:
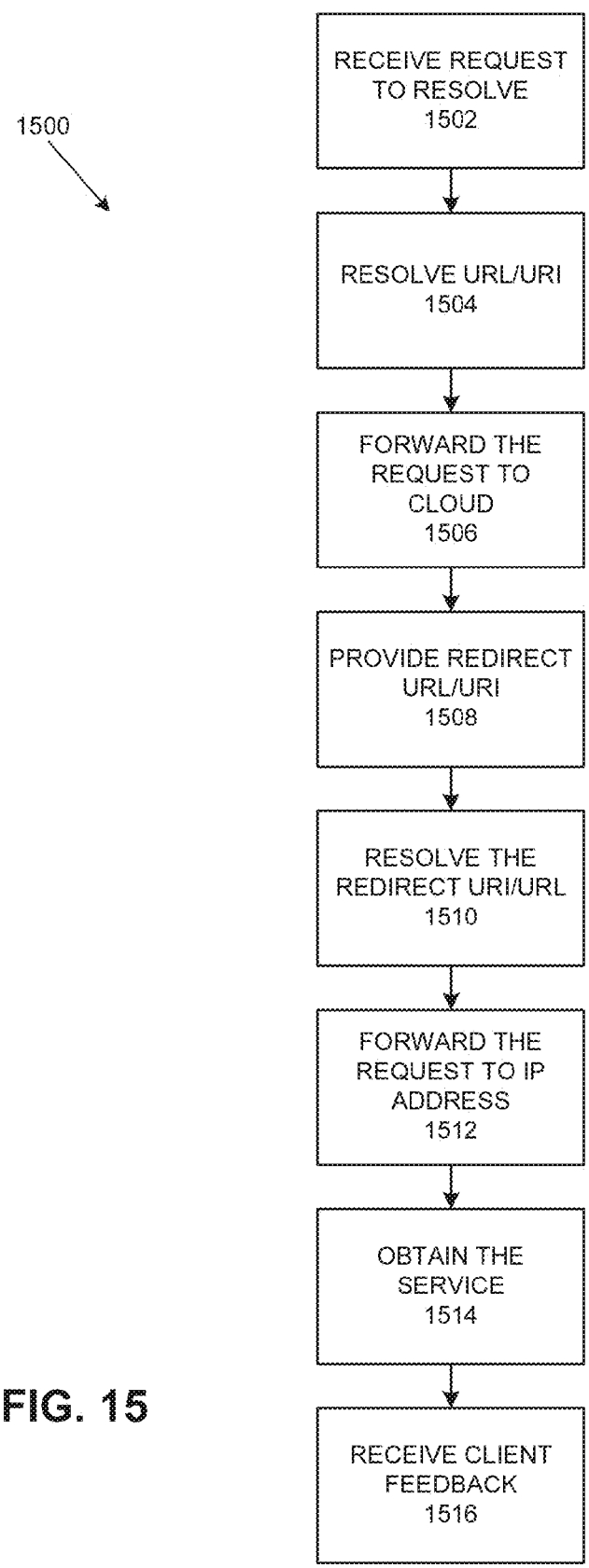
FIG. 15 is a flow diagram of another exemplary process that is associated with the topology manager of FIGS. 1A and 1B.

FIG. 15 is a flow diagram of another exemplary process 1500 that is associated with operation of PCTM system 106. More specifically, process 1500 is associated with selecting cloud 102 or a route to cloud 102 (e.g., the dual stage cloud selection process or the single stage cloud selection process).

As shown, process 1500 may include, by DNS 900, receiving a request to resolve a cloud domain name to an IP address (block 1502). In response, DNS 900 resolves the domain name to the IP address (block 1504). When user device 114 receives the IP address, user device 114 forwards a request for service to a device/cloud corresponding to the IP address (block 1506).

When the device/cloud corresponding to the IP address receives the request for service, a web server hosted on the device/cloud provides a redirect URL/URI to user device 114, by either looking up its routing rules (received from request router 112 or topology manager 110) or by querying a request router 112 (block 1508). Upon receipt of the redirect URL/URI, user device 114 may resolve the redirect URL/URI (e.g., via DNS 900) to an IP address (block 1510), and forward its request for service to the resolved IP address (block 1512).

When a device/cloud 102 corresponding to the resolved IP address receives the request for service from user device 114, the device/cloud 102 may provide the service to user device 114 (block 1514). In some implementations, user device 114 may provide some feedback information (e.g., user experience, download time, etc.). The feedback information may be forwarded to topology manager 110 (block 1516).

Figure 16:
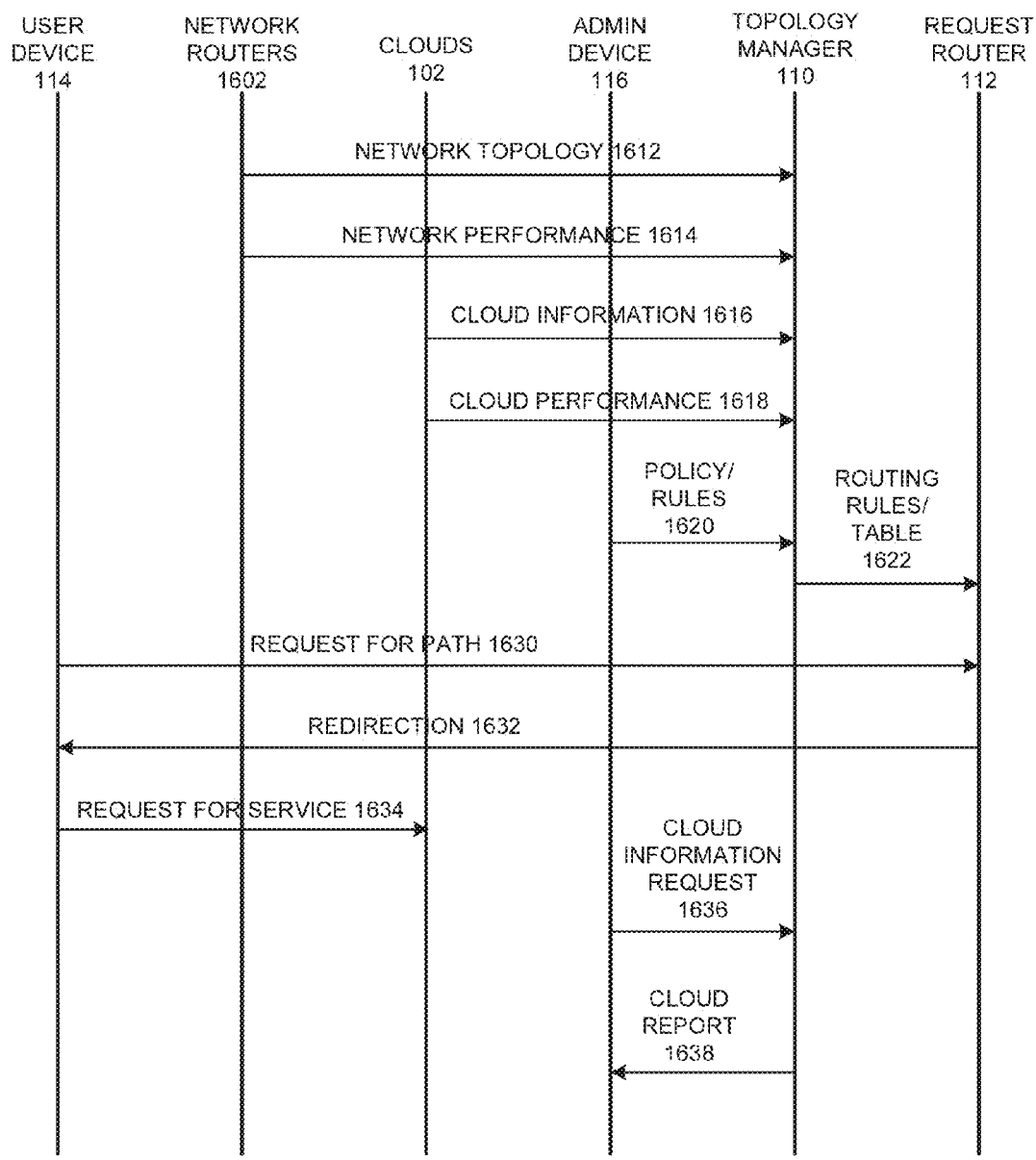
FIG. 16 is a diagram illustrating an exemplary flow of messages between the network devices/elements of FIG. 1B.

FIG. 16 is a diagram illustrating an exemplary flow of messages between network devices/elements of FIG. 1B. As shown, topology manager 110 may receive network topology information 1612, network performance data 1614, cloud information 1616 (e.g., service or cloud topology information, cloud device information, etc.), and cloud or service performance data 1618 from network routers 1602 and clouds 102. Although not illustrated, in some implementations, topology manager 110 may receive network or cloud information also from administration device 116.

As shown, topology manager 110 may receive policies and/or rules 1620 from administration device. Furthermore, based on the received policies/rules 1620, topology manager 110 may generate routing rules/table 1622 and forward routing rules/table 1622 to request router 112.

When request router 112 receives a request for a path 1630 to cloud 102 from a user device 114, request router 112 may provide a redirection address (e.g., IP address, URL, URL, etc.) 1632 to user device 114. Based on redirection address 1632, user device 104 may send a request 1634 for service to cloud 102.

In some implementations, topology manager 110 may provide reports on PIP networks, VPNS, clouds, etc., to administrators via administration device 116. This is illustrated in FIG. 16, in which administration device 116 sends a request for cloud information 1636 to topology manage 110. In response, topology manager 110 provides a report 1638 to administration device 116. Depending on the implementation, topology manager 110 may also provide GUI interface via which an administrator can access the information in the report.

This specification describes PCTM system 106 that may allow a user application to receive services from different clouds 102. To allow this, PCTM system 106 may generate routing rules. The routing rules may specify, for particular state variable values (e.g., time, bandwidth, quality of service, etc.), which route is likely to provide the best/worst latency, the highest/lowest cost, the maximum/minimum bandwidth, the least number of errors, etc. When PCTM system 106 receives a request for service from a user application on user device 114, cloud selection system 106 may direct the user application to a particular cloud 102 based on the rules, the state variable values, and cloud selection policies.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 9, 10, 14, and 15, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software. No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A system comprising:
  a topology manager, implemented in hardware, configured to:
    receive network topological information from devices in a private Internet Protocol (PIP) network;
    receive network performance data from the devices, wherein the network performance data includes, for each of the devices, network traffic data for each of differentiated service point (DSCP) markings for different classes of data;
    receive service topological information from a cloud;
    receive service performance data from the cloud;
    receive, from an administration device, policies for determining optimum routes to the cloud;
    apply the policies to the network topological information, the network performance data, the service topological information, and the service performance data to obtain routing rules; and
    forward the routing rules to a set of request routers, for providing, to a user device, information regarding a path to the cloud.

2. The system of claim 1, further comprising the request routers, wherein the request routers are configured to:
  receive the routing rules from the topology manager;
  receive a request for the path to the cloud from the user device;
  in response to receiving the request, send a message indicating the path to the cloud or recommending another cloud.

3. The system of claim 2, wherein the user device is connected to the PIP network via one of:
  a wireless link;
  one or more tunnels; or
  a partner network to the PIP network.

4. The system of claim 2, wherein the message includes:
  an address of the cloud; or
  an address of the other cloud.

5. The system of claim 2, wherein the message includes:
  a hypertext transfer protocol (HTTP) 302 redirect response.

6. The system of claim 1 wherein the network topological information indicates at least one of:
  a star topology;
  a tree topology; or
  a fully-meshed topology.

7. The system of claim 1, wherein the different classes of data include:
  voice data and real-time data that correspond to expedited forwarding markings of the DSCP;
  video data and priority data, of high priority, that correspond to assured forwarding 41 of the DSCP; and
  video data and priority data, of low priority, that correspond to assured forwarding 42/43 of the DSCP.

8. The system of claim 1, wherein the topology manager is configured to:
  receive a request for cloud information from the administration device; and
  provide, to the administration device, a report in response to receiving the request.

9. The system of claim 1, wherein the cloud provides at least one of:
  a Software-as-a-Service (SaaS);
  a Platform-as-a-Service (PaaS); or
  an Infrastructure-as-a-Service (IaaS).

10. The system of claim 1, wherein the request routers are configured to forward address information to an intermediate device, wherein the intermediate device includes at least one of:
  a DNS server device; or
  a host device that includes a web server.

11. A method comprising:
  receiving network topological information from devices in a private Internet Protocol (PIP) network;
  receiving network performance data from the devices, wherein the network performance data includes, for each of the devices, network traffic data for each of differentiated service point (DSCP) markings for different classes of data;
  receiving service topological information from a cloud;
  receiving service performance data from the cloud;
  receiving, from an administration device, policies for determining optimum routes to the cloud;
  applying the policies to the network topological information, the network performance data, the service topological information, and the service performance data to obtain routing rules; and
  forwarding the routing rules to a set of request routers for providing, to a user device, information regarding a path to the cloud.

12. The method of claim 11, further comprising:
  receiving a list of clouds from the administration device, wherein the list of clouds includes an identifier for the cloud; and wherein the policies include policies for selecting one of the clouds.

13. The method of claim 12, further comprising:
  receiving configuration information for collecting network data; and
  sending the configuration information to the devices.

14. The method of claim 13, wherein the network performance data includes:
  simple network management protocol (SNMP) data.

15. The method of claim 14, wherein the network topological information and service topological information include one or more of:
  a virtual private network (VPN) topology map;
  a multiprotocol label switched (MPLS) network topology map;

an autonomous system (AS) topology map;
a global topology map of clouds; or
a topology map of a cloud for a particular service.

16. The method of claim 11, wherein the network performance data and the service performance data include at least one of:
aggregated traffic load on networks or virtual networks;
traffic loads between cloud devices;
load conditions on each of cloud devices;
bandwidth consumption of cloud traffic per each of differentiated services code point (DSCP) classes.

17. A device comprising:
a network interface to communicate with devices in a private Internet Protocol (PIP) network and to communicate with a cloud;
a memory to store instructions; and
one or more processors to execute the instructions to:
receive network topological information from the devices via the network interface;
receive network performance data from the devices, wherein the network performance data includes, for each of the devices, network traffic data for each of differentiated service point (DSCP) markings for different classes of data;
receive service topological information from the cloud;
receive service performance data from the cloud;
receive, from an administration device, policies for determining optimum routes to the cloud from an administration device;
apply the policies to the network topological information, the network performance data, the service topological information, and the service performance data to obtain routing rules; and
forward the routing rules to a set of request routers for providing, to a user device, information regarding a path to the cloud.

18. The device of claim 17, wherein the request routers are configured to:
receive the routing rules from a topology manager;
receive a request for the path to the cloud from the user device;
in response to receiving the request, send a message indicating the path to the cloud or recommending another cloud.

19. The device of claim 18, wherein the user device is connected to the PIP network via one of:
a wireless link;
one or more tunnels; or
a partner network to the PIP network.

* * * * *